(12) United States Patent
Lee, Jr.

(10) Patent No.: US 10,173,808 B2
(45) Date of Patent: Jan. 8, 2019

(54) BUCKET HANDLE RETAINER

(71) Applicant: James Arthur Lee, Jr., Ukiah, CA (US)

(72) Inventor: James Arthur Lee, Jr., Ukiah, CA (US)

(*) Notice: Subject to any disclaimer, the term of this patent is extended or adjusted under 35 U.S.C. 154(b) by 6 days.

(21) Appl. No.: 15/330,439

(22) Filed: Sep. 22, 2016

(65) Prior Publication Data

US 2018/0079555 A1   Mar. 22, 2018
US 2018/0257819 A9   Sep. 13, 2018

Related U.S. Application Data

(60) Provisional application No. 62/284,341, filed on Sep. 28, 2015.

(51) Int. Cl.
| *B65D 25/32* | (2006.01) |
| *A47J 45/06* | (2006.01) |
| *A47J 47/18* | (2006.01) |
| *F16M 13/02* | (2006.01) |

(52) U.S. Cl.
CPC ............ *B65D 25/32* (2013.01); *A47J 45/065* (2013.01); *A47J 47/18* (2013.01); *F16M 13/02* (2013.01)

(58) Field of Classification Search
CPC ...... B44D 3/14; B65D 25/2811; B65D 25/32; Y10T 16/4707
See application file for complete search history.

(56) References Cited

U.S. PATENT DOCUMENTS

| 166,364 | A | * | 8/1875 | Hartwell | ............... | B65D 25/32 |
| | | | | | | 220/760 |
| 2,188,728 | A | * | 1/1940 | Spencer | .................. | B44D 3/14 |
| | | | | | | 220/762 |
| 2,747,765 | A | * | 5/1956 | Pottle | ..................... | B65D 25/32 |
| | | | | | | 220/769 |
| 3,960,289 | A | * | 6/1976 | Panicci | ................. | B65D 25/30 |
| | | | | | | 220/318 |
| 4,823,433 | A | * | 4/1989 | Curtis | ...................... | B44D 3/14 |
| | | | | | | 16/411 |
| 5,445,425 | A | * | 8/1995 | Lyver | ....................... | B44D 3/12 |
| | | | | | | 220/760 |
| 6,863,191 | B2 | * | 3/2005 | Kesling | ................. | B44D 3/123 |
| | | | | | | 220/697 |
| 7,975,874 | B2 | * | 7/2011 | Scott | ..................... | A47J 45/071 |
| | | | | | | 16/425 |
| 8,708,383 | B1 | * | 4/2014 | Roberts | ..................... | B66F 9/18 |
| | | | | | | 294/67.33 |
| 8,870,252 | B2 | * | 10/2014 | Pratho | ................ | B65D 25/2817 |
| | | | | | | 16/422 |
| 9,555,930 | B2 | * | 1/2017 | Campbell | .......... | B65D 25/2844 |

(Continued)

*Primary Examiner* — Bradley Duckworth
(74) *Attorney, Agent, or Firm* — Christopher Peil; Law Offices of Christopher Peil

(57) ABSTRACT

A bucket handle retainer with a substantially flat rectilinear resilient plate. The plate has an upper tip that corresponds to the inside dimension of the internal cavity of the handle holding portion of a standard five gallon bucket. The plate includes a spring biased finger capable of frictionally engaging the inside wall of the handle holding portion. The plate also includes a holding portion capable of being grasped by a user's fingers to insert or remove the plate from the handle holding portion of the bucket. A preferred embodiment includes the handle retainer is injection molded from nylon plastic.

1 Claim, 6 Drawing Sheets

(56) References Cited

U.S. PATENT DOCUMENTS

2007/0267426 A1\* 11/2007 Arciniegas ............. B65D 25/32
                                                                         220/756
2016/0236817 A1\* 8/2016 Albrecht ................ B65D 25/32

\* cited by examiner

BUCKET HANDLE RETAINER

CROSS REFERENCE TO RELATED APPLICATIONS

This Application claims benefit of U.S. provisional patent application Ser. No. 62/284,341, filed Sep. 28, 2015, which is incorporated herein in its entirety by this reference.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of handle accessories for containers and more specifically to a bucket handle retainer.

Five gallon plastic buckets are commonly used by painters, carpenters and other trades people for storing and moving various items. These buckets tend to be very similar in design regardless of manufacturer. They include a wire-form handle that allows the user to pick up the bucket and carry it from on area to another.

It would be helpful if the user had the option to have the handle remain in a relatively upright position during use so that each time he or she wanted to lift the bucket, he or she would not have to bend down and reach the folded down handle and rotate it up to the use position before lifting the bucket. U.S. Pat. No. 4,832,433 by G Curtis, now in the public domain, tries to address this problem by proposing a special hand grip that attaches to the wire-form handle that includes a perpendicular post terminating in a J shaped hook that can engage the lip of a paint can—thereby keeping the handle in a relatively upright position.

Although the Curtis design may be helpful in relation to picking up paint cans, it has several deficiencies. First, the paint can needs to come equipped with the special handle, it is not designed as something that can be added to an existing paint can with a wire form handle. Second, the J hook design would not work well on the lip of a standard five gallon bucket lip.

BRIEF SUMMARY OF THE INVENTION

The primary object of the invention is to provide a handle retainer for a five gallon bucket that holds the handle portion in an upright position.

Another object of the invention is to provide a bucket handle retainer that is easily replaceable and removable.

Another object of the invention is to provide a bucket handle retainer that is spring biased so that it can remain in place via frictional forces.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a bucket handle retainer comprising: a substantially flat rectilinear resilient plate, said plate having an upper tip that corresponds to the inside dimension of the internal cavity of the handle holding portion of a standard five gallon bucket, said plate including a spring biased finger capable of frictionally engaging the inside wall of said handle holding cavity portion, and said plate also including a holding portion capable of being grasped by a user's fingers to insert or remove said plate from said handle holding portion.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
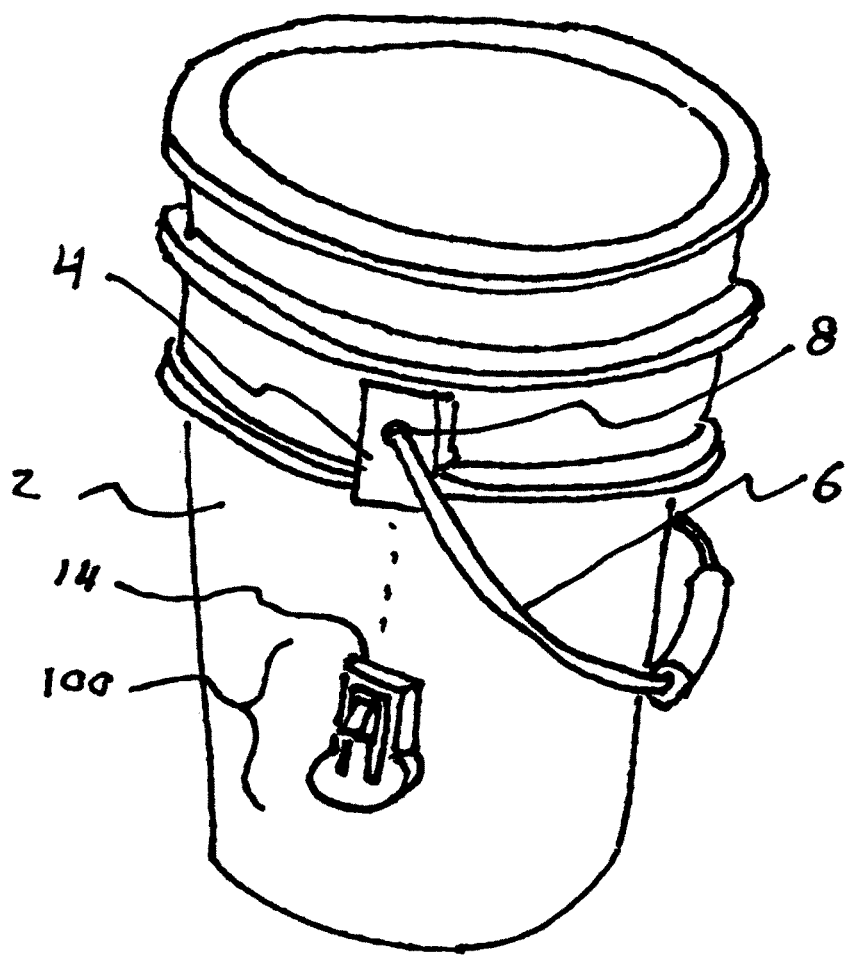
FIG. 1 is a perspective view of the invention about to be attached to a standard five gallon bucket.

Referring now to FIG. 1 we see a perspective view of a standard five gallon bucket 2 made of injection molded plastic. The handle retainer of the present invention 100 is about to be inserted into the cavity 4 that is found in most standard buckets 2 which is used for holding the wire-form handle 6 in place.

Figure 2:
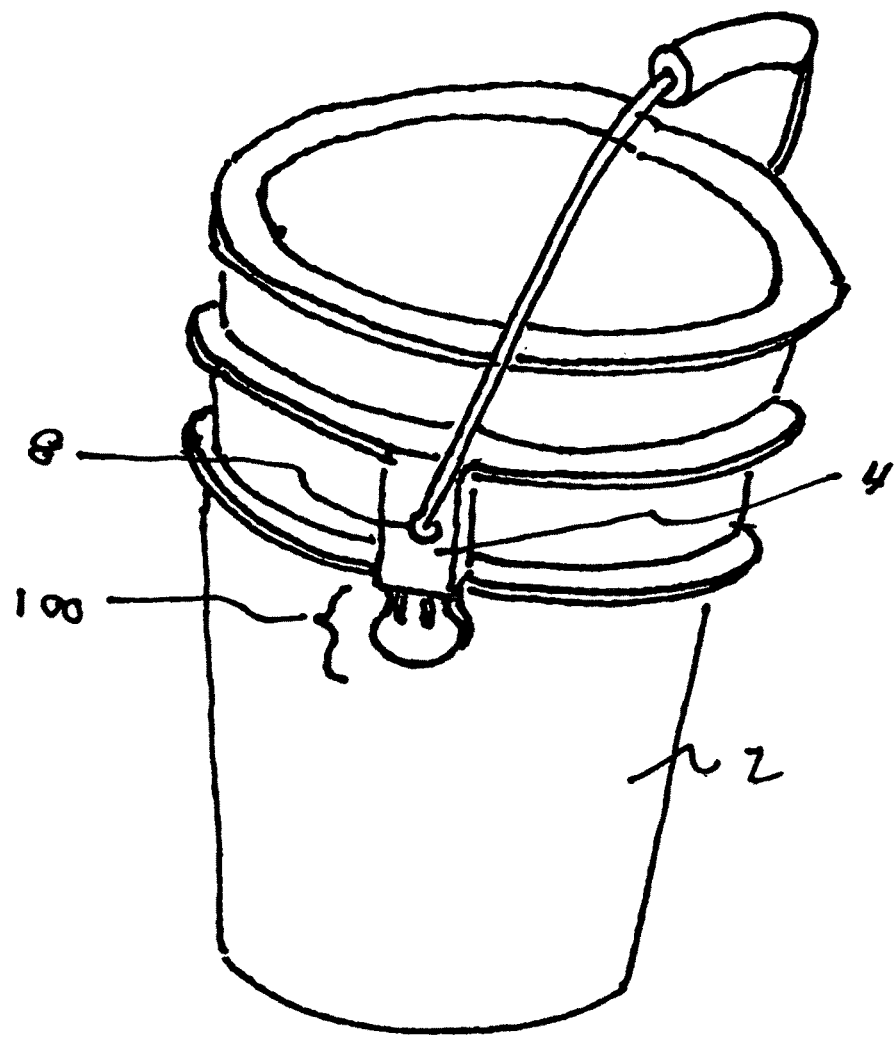
FIG. 2 is a perspective view of the invention installed in a standard five-gallon bucket.
Figure 3:
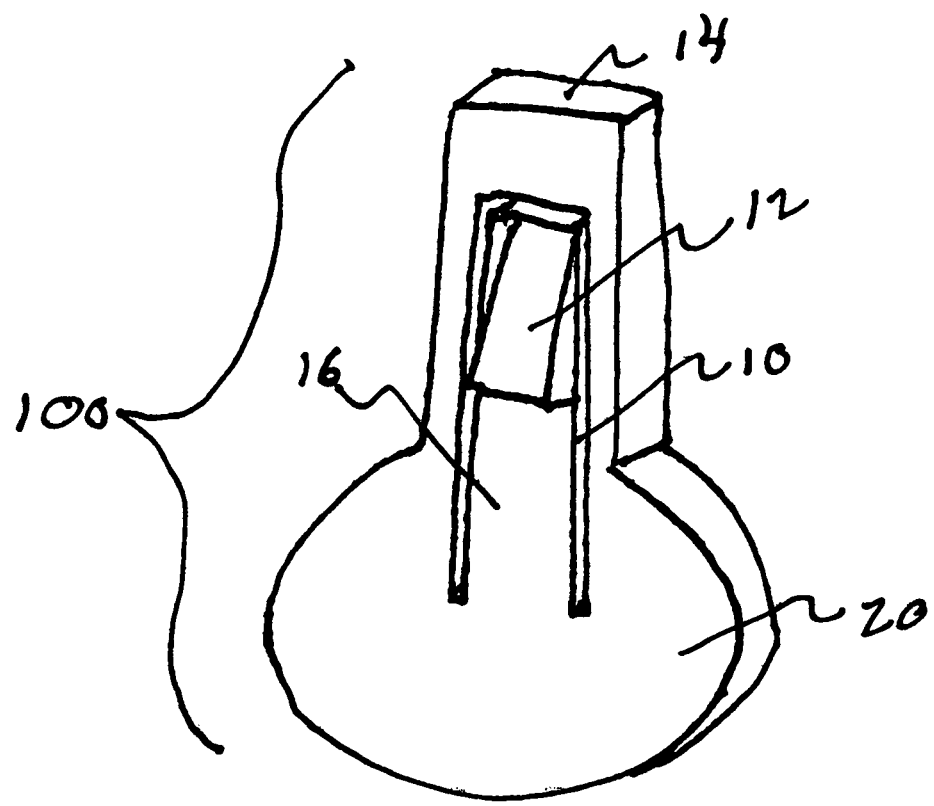
FIG. 3 is an enlarged perspective view of the invention.
Figure 4:
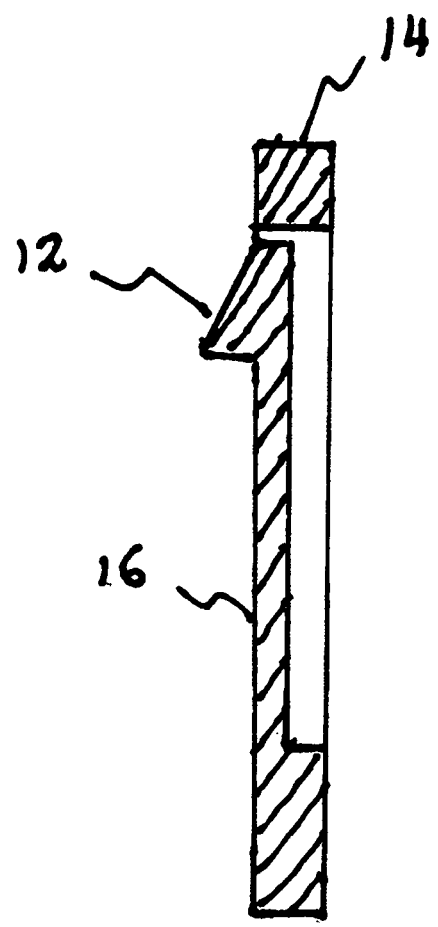
FIG. 4 is a side section view of the invention.

When the user inserts the handle retainer of the present invention 100 as shown in FIG. 2, the top most portion 14 of the handle retainer 100, as shown in FIG. 3, presses up against the bent wire-form handle 6 end and causes the handle 6 to remain in a relatively vertical position as shown in FIG. 2.

Figure 5:
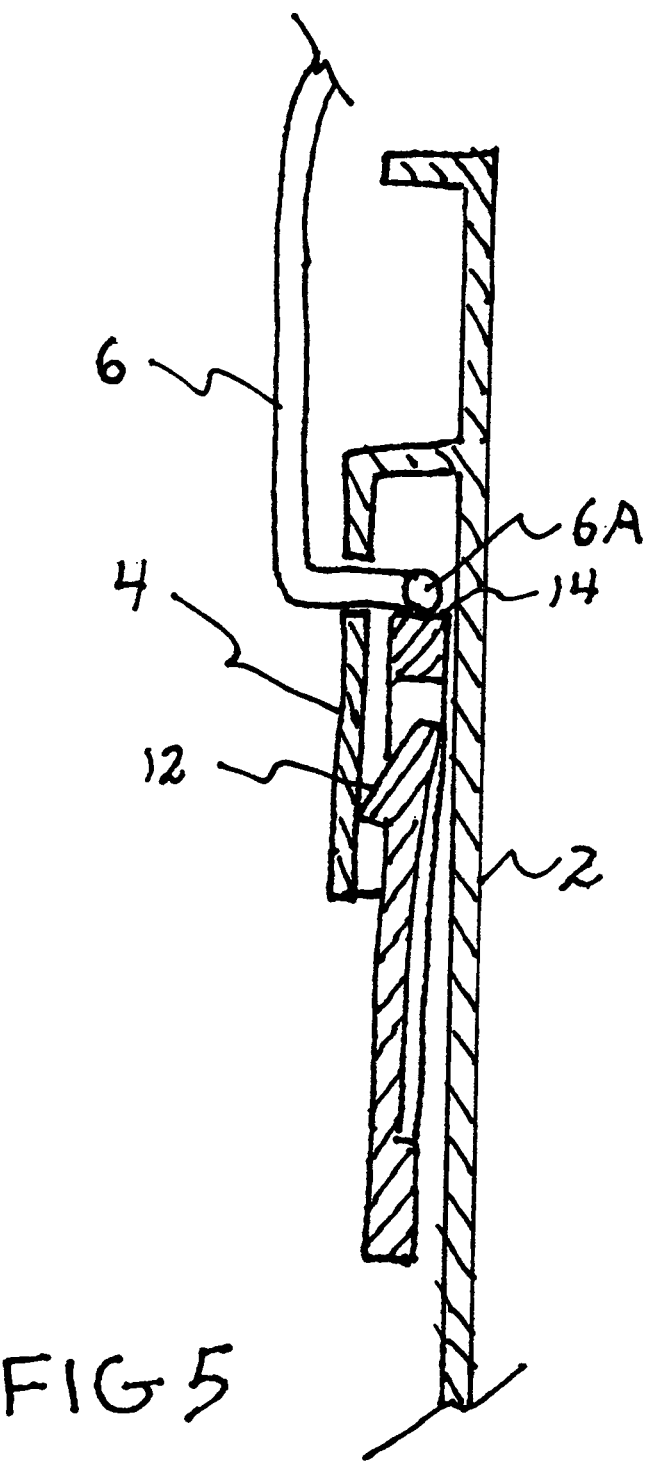
FIG. 5 is a side section view of the invention installed in a standard five gallon bucket.

FIG. 3 is a perspective view of the invention 100. The lower portion 2 of the handle retainer 100 can be grasped by the user's fingers to help insert the retainer 100. The central portion includes a spring biased finger 16 that is cut out 10 of the mid portion as shown in side section view 4. The top portion of the finger 16 includes a ramp 12 so that as the user pushes the retainer 100 up into the cavity 4, the ramp 12 flexes inward and exerts a frictional force on the inside wall of the cavity 4, as shown in the side section view in FIG. 5, causing the retainer to remain in place until the user decides to remove it. FIG. 5 also shows the right angle portion 6A of the wire-form handle, which is held up by the tip 14 of the retainer 100.

Figure 6:
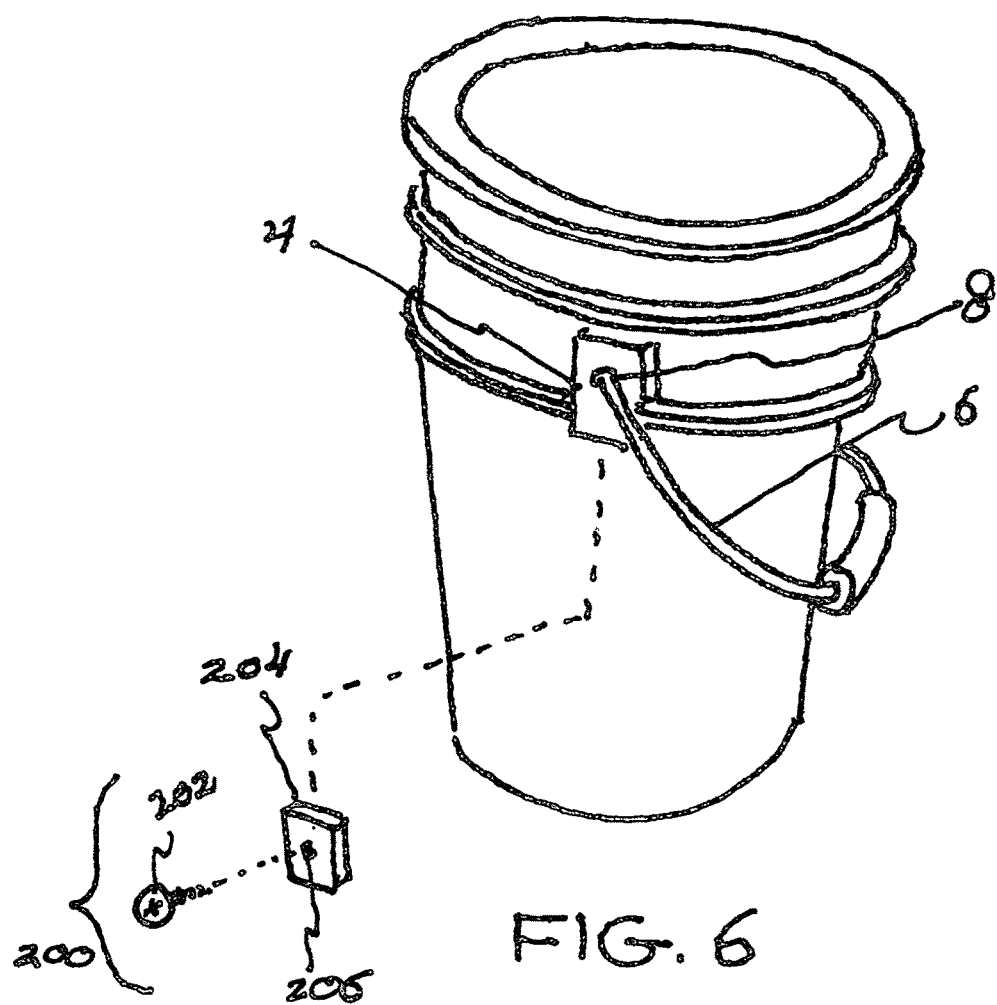
FIG. 6 is a perspective view of a second embodiment of the invention.

FIG. 6 is a perspective view of a second embodiment of the invention 200. In this embodiment, the shape of the insertion piece 204 is a rectilinear plastic block. It includes an aperture 206 that lets the user install a self-tapping threaded screw through a hole in receptacle 4, made by the self-tapping screw 202 and into the aperture 206 causing the rectilinear block 204 to be fixed in place.

An additional benefit to the invention 100 is that it acts as a spacer between stacked buckets so that the stacked buckets can be more easily separated from each other.

The above described and illustrated invention is easy and economical to manufacture and can be printed with the logo of a retail store or manufacturing company and sold as an ad specialty item.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A bucket and a bucket handle retainer comprising:
    a bucket with a handle and a handle holding portion having an internal cavity;
    a flat rectilinear resilient plate in the form of a block of plastic;
    said block including an aperture allowing a screw to hold said block within said internal cavity of said handle holding portion of said bucket when said screw penetrates an outer wall of said cavity and enters the aperture of said plastic block.

* * * * *